US006702379B2

United States Patent
Kain

(10) Patent No.: US 6,702,379 B2
(45) Date of Patent: Mar. 9, 2004

(54) MOVABLE SEAT PROTECTOR FOR VEHICLE SEAT

(75) Inventor: James M. Kain, Troy, OH (US)

(73) Assignee: Cosco Management, Inc., Wilmington, DE (US)

( * ) Notice: Subject to any disclaimer, the term of this patent is extended or adjusted under 35 U.S.C. 154(b) by 72 days.

(21) Appl. No.: 10/101,797

(22) Filed: Mar. 19, 2002

(65) Prior Publication Data

US 2002/0171275 A1 Nov. 21, 2002

Related U.S. Application Data

(60) Provisional application No. 60/292,492, filed on May 21, 2001.

(51) Int. Cl.$^7$ ................................................ A47C 1/08
(52) U.S. Cl. ................................. 297/250.1; 297/256.16
(58) Field of Search ..................... 297/250.1, 256.17, 297/256.16, 218.1, 218.2, 218.3, 219.1, 219.12, 218.5, 229, 217.1, 182; 108/44, 45

(56) References Cited

U.S. PATENT DOCUMENTS

| 4,600,238 A | * | 7/1986 | Goodford ............... 297/229 X |
| 4,790,592 A | * | 12/1988 | Busso et al. ............ 297/229 X |
| 5,330,250 A | * | 7/1994 | Reyes ......................... 297/229 |
| 5,330,251 A | * | 7/1994 | McGuire ..................... 297/229 |
| 5,549,353 A | * | 8/1996 | Gaudet et al. .............. 297/182 |
| 5,662,378 A | * | 9/1997 | Carruth .................. 297/256.15 |
| 6,382,720 B1 | * | 5/2002 | Franklin et al. ....... 297/228.13 |

OTHER PUBLICATIONS

Kbtoys.com, Munchkin Auto Seato Protector.* recall.djgusa.com, Dorel Juvenile Group Consumer Relatiosn.*

Cosco Juvenile Products '96 Catalog, "Convertible Car Seats", p. 7.

* cited by examiner

*Primary Examiner*—Peter M. Cuomo
*Assistant Examiner*—Stephen Vu
(74) *Attorney, Agent, or Firm*—Barnes & Thornburg

(57) ABSTRACT

A juvenile booster seat includes a seat protector arranged to be moved by a user between a retracted position stored inside the booster seat and an extended position partly removed from the booster seat. In the extended position, a forward portion of the seat protector is positioned to drape over a front portion of a vehicle seat underlying the booster seat.

20 Claims, 4 Drawing Sheets

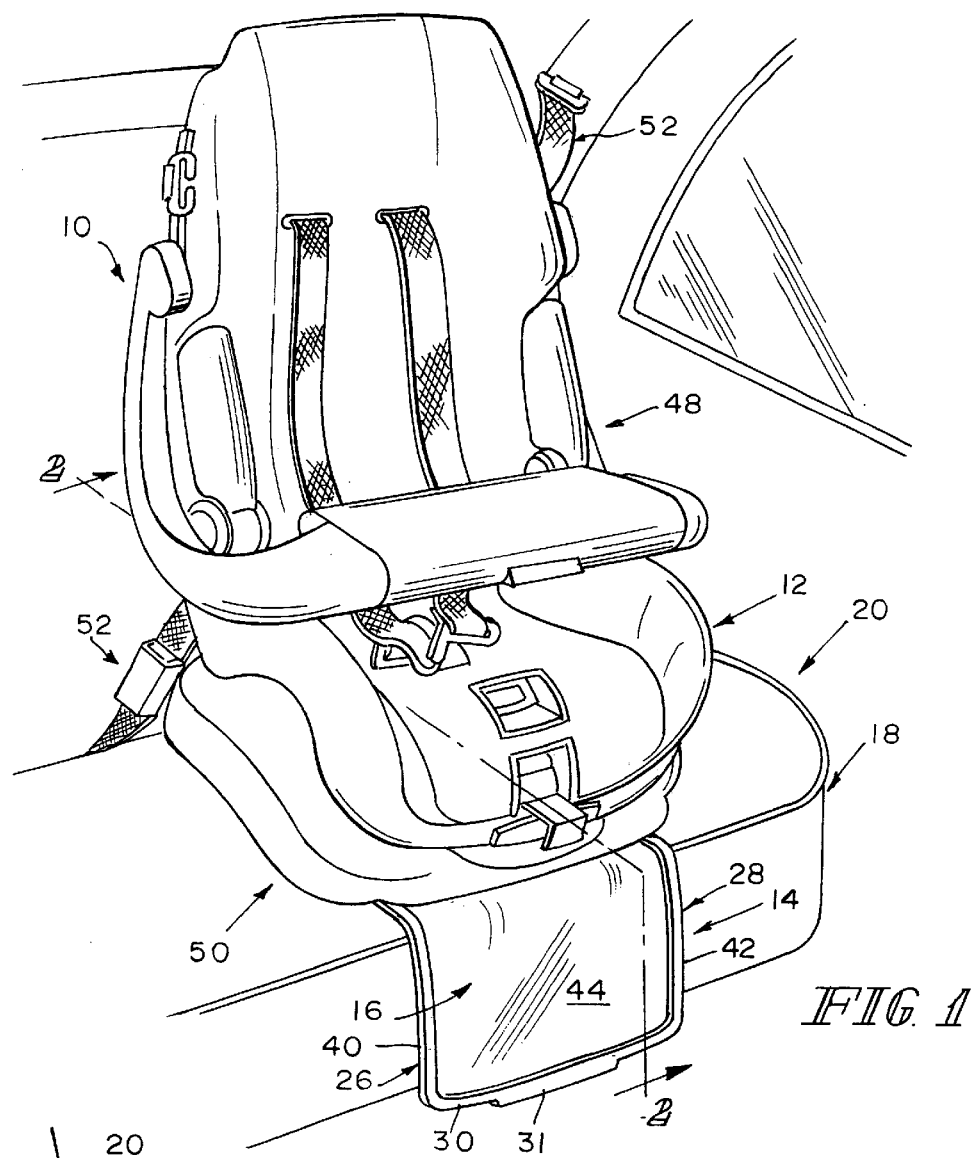
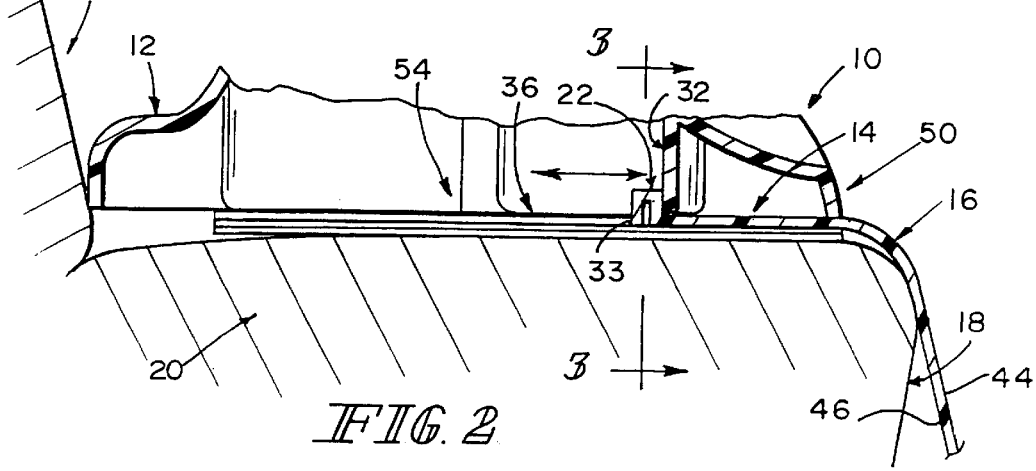

MOVABLE SEAT PROTECTOR FOR VEHICLE SEAT

This application claims priority under 35 U.S.C. 119(e) to U.S. Provisional Application Serial No. 60/292,492, filed May 21, 2001, which is expressly incorporated by reference herein.

BACKGROUND AND SUMMARY

The present disclosure relates to a seat protector for use on a vehicle seat, and particularly to a seat protector associated with a juvenile vehicle seat adapted to be mounted on a vehicle seat. More particularly, the present disclosure relates to a seat protector that is movable relative to a juvenile vehicle seat to cover a portion of the vehicle seat underlying the juvenile vehicle seat.

Juvenile vehicle seats are used to transport young children in automobiles or other vehicles. Seats for infants are adapted to set on a vehicle seat and face in a rearward direction toward the rear end of the vehicle. Booster seats for older children are adapted to set on a vehicle seat and face in a forward direction toward the front end of the vehicle. The lower legs and feet of a child seated in a forward-facing booster seat will contact horizontal and vertical exposed surfaces of the vehicle seat underlying the forward-facing booster seat.

According to the present disclosure, a juvenile booster seat includes a seat unit and a seat protector. The seat protector is mounted for movement in the seat unit from a retracted position stored in the seat unit to an extended position withdrawn partly from the seat unit to drape over a portion of a vehicle seat underlying the seat unit.

In an illustrative embodiment, the seat protector includes a pliable protective sheet, a retainer located at or near a rear edge of the protective sheet, and a pair of guides located along side edges of the pliable protective sheet. The guides are arranged to slide back and forth in guide channels included in the seat unit during movement of the protective sheet relative to the seat unit between the retracted and extended positions. The retainer is arranged to contact a retainer stop included in the seat unit to limit movement of the pliable protector sheet relative to the seat unit so that the seat protector can be moved easily by a user to the extended position without separating the seat protector from the seat unit.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a juvenile booster seat mounted in a forward-facing position on a juvenile vehicle seat showing a seat protector suspended from a base of the juvenile booster seat to lie in an extended position to cover exposed horizontal and vertical portions of the vehicle seat underlying the juvenile booster seat;

FIG. 2 is a sectional view taken along line 2—2 of FIG. 1 showing a retainer provided along a rear portion of a pliable protective sheet included in the seat protector in contact with a retainer stop provided in the booster seat base to limit movement of the seat protector relative to the base to block separation of the seat protector from the base following movement of the seat protector to the extended position;

DETAILED DESCRIPTION OF THE DRAWINGS

Figure 6:
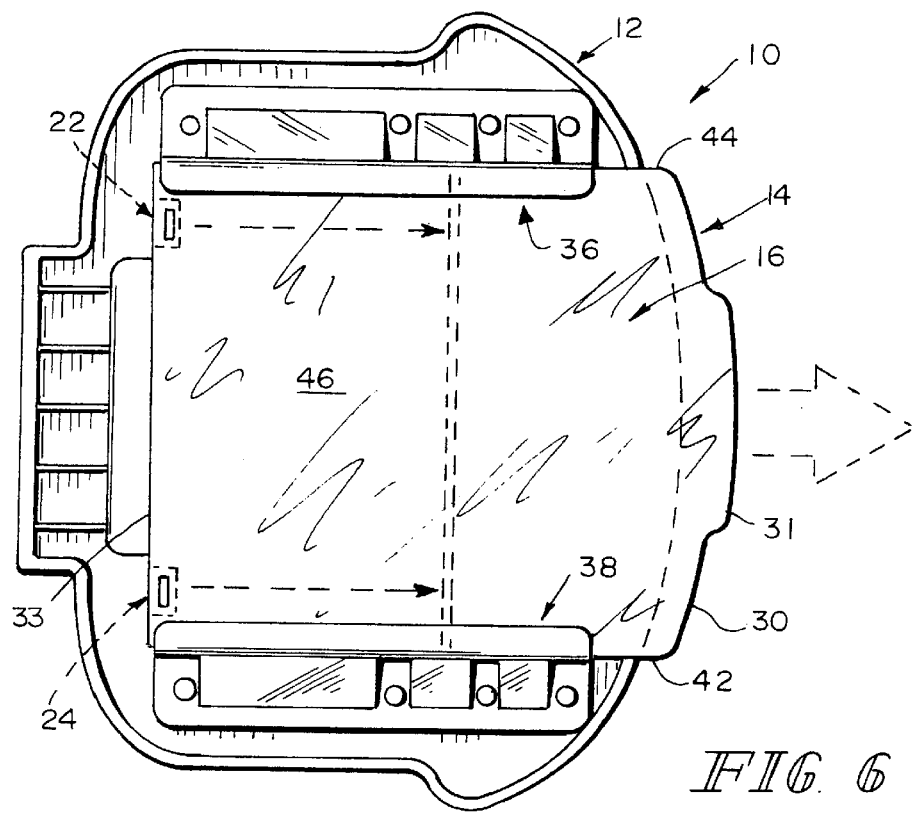
FIG. 6 is a bottom view of the booster seat of FIGS. 1–3 showing the seat protector in a retracted position relative to the booster seat base.
Figure 7:
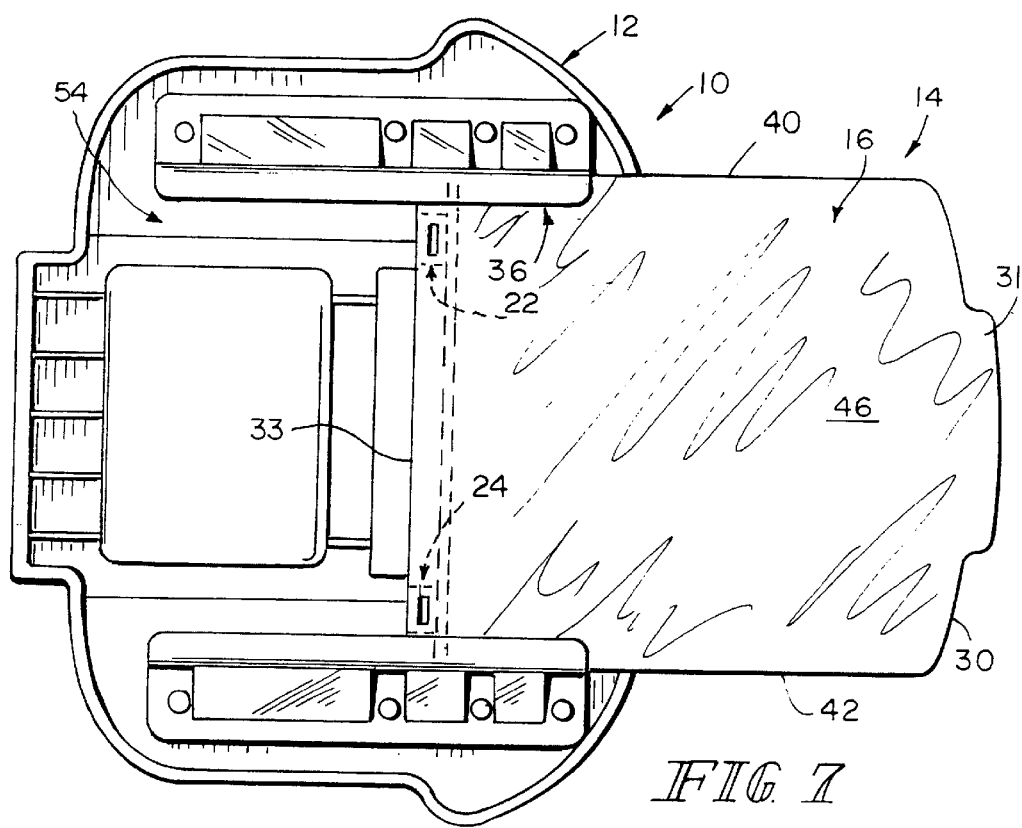
FIG. 7 is a bottom view similar to FIG. 6 showing the seat protector in an extended position relative to the booster seat base before a forward portion of the pliable protective sheet is "draped" over a front edge of the vehicle seat underlying the booster seat to present the "suspended" appearance shown in FIGS. 1 and 2.

A juvenile booster seat 10 includes a seat unit 12 and a seat protector 14 mounted for movement relative to seat unit 12 between an extended position shown, for example, in FIGS. 1, 2, and 7 and a retracted position shown, for example, in FIG. 6. Seat protector 14 includes a pliable protective sheet 16 that is adapted and positioned to "drape" over a front portion 18 of a vehicle seat 20 underlying seat unit 12 when seat protector 14 is moved to assume the extended position as shown, for example, in FIGS. 1 and 2.

Figure 3:
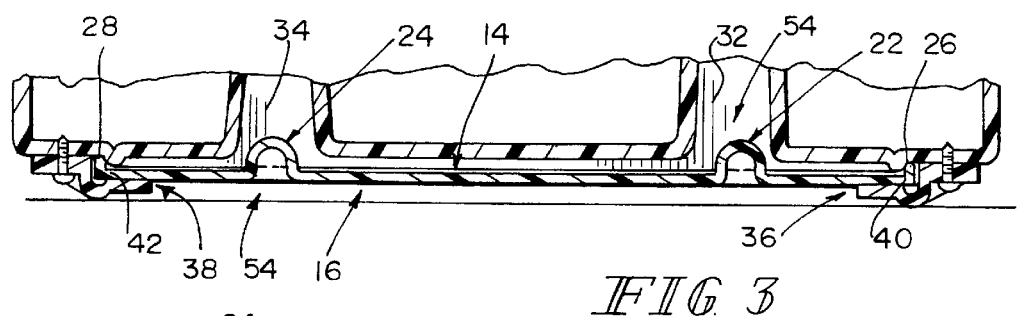
FIG. 3 is a sectional view taken along line 3—3 of FIG. 2 showing side edges of the pliable protective sheet received guide channels formed in the booster seat base and showing two retainers arranged to lie in spaced-apart relation to one another on the pliable protective sheet and in engagement with retainer stops included in the booster seat base.
Figure 4:
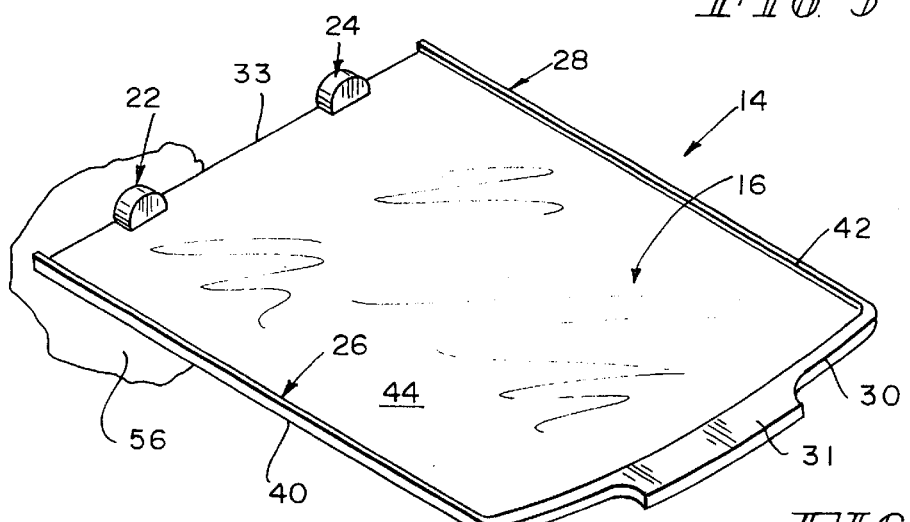
FIG. 4 is a perspective view of the seat protector of FIGS. 1–3 showing a pliable protective sheet, a grip handle on a front edge of the sheet, a pair of retainers on a rear edge of the sheet, and a guide provided on each side edge of the sheet and arranged to slide back and forth in one of the guide channels formed in the booster seat base as the seat protector is moved between a retracted position shown in FIG. 6 and an extended position shown in FIG. 7.

Seat protector 14 further includes first and second retainers 22, 24 coupled to pliable protective sheet 16 as shown, for example, in FIG. 4. Retainer stops 32, 34 are provided in seat unit 12 to contact first and second retainers 22, 24 as shown, for example, in FIGS. 2 and 3 to limit movement of seat protector 14 relative to seat unit 12 during movement of seat protector 14 from the retracted position shown in FIG. 6 to the extended position shown in FIG. 7.

Seat protector 14 also includes first and second guides 26, 28 coupled to pliable protective sheet 16 as shown, for example, in FIG. 4. Guide channels 36, 38 are provided in seat unit 12 to lie in spaced-apart relation to one another so that each of the guides 26, 28 extend into one of the guide channels 36, 38 to support pliable protective sheet 16 for sliding movement relative to seat unit 12 between the retracted and extended positions.

Figure 5:
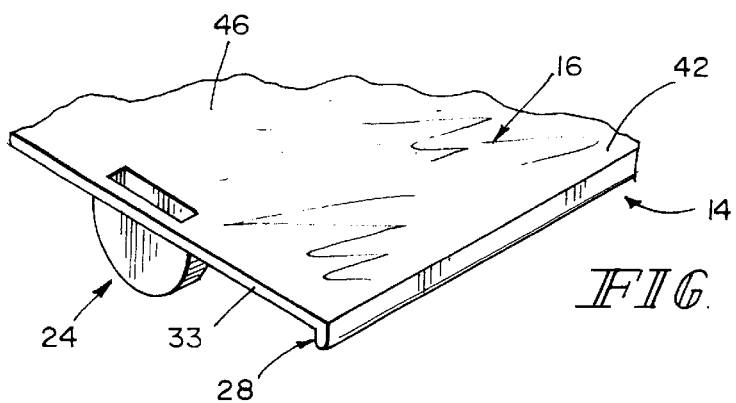
FIG. 5 is an enlarged perspective view of a portion of the seta protector of FIG. 4 showing one of the retainers and a portion of one of the guides.

Pliable protective sheet 16 includes a front edge 30, a rear edge 33, and first and second side edges 40, 42 extending between front edge 30 and rear edge 33 as shown, for example, in FIG. 4. Front edge 30 is formed to include hand grip 31 as shown, for example, in FIGS. 1, 4, 6, and 7 to facilitate movement of seat protector 14 from the retracted position to the extended position. Pliable protective sheet 16 also includes a top surface 44 and an oppositely facing bottom surface 46 as shown, for example, in FIGS. 4 and 5.

Seat unit 12 includes a seat shell 48 (providing a seating surface 49) and a base 50 under seat shell 48 as shown, for example, in FIGS. 1 and 2. A vehicle safety belt 52 is used to retain seat unit 12 in a fixed position on vehicle seat 20 in any suitable manner. Top surface 44 of sheet 16 is arranged to face upwardly toward seating surface 49 when seat protector 14 is moved to assume the retracted position. Bottom surface 46 of sheet 16 is arranged to face downwardly away from seating surface 49 and toward vehicle seat 20 when seat protector 14 is moved to assume the retracted position.

Base 50 is formed to include an interior region 54 configured to receive seat protector 14 therein when seat protector 14 is moved to assume the retracted position as suggested, for example, in FIGS. 2, 6, and 7. Guide channels 36, 38 are arranged to open into interior region 54 and each of side edges 40, 42 (and guides 26, 28) are arranged to extend into one of the guide channels 36, 38 to support pliable protective sheet 16 for sliding movement relative to seat unit 12 between the retracted and extended positions.

As suggested in FIG. 4, pliable protective sheet 16 moves to assume a "planar" shape when laid on a flat surface 56. Guides 26, 28 are oriented to extend upwardly away from top surface 44 of pliable protective sheet 16 when such sheet 16 is laid on a flat surface. Retainers 22, 24 are also oriented to extend upwardly away from top surface 44 of pliable protective sheet 16 when sheet 16 is laid on a flat surface. Because of the pliability of sheet 16, it can drape over front portion 18 of vehicle seat 20 when seat protector 14 is moved to assume the extended position shown in FIGS. 1 and 2.

Each retainer 22, 24 is positioned to lie in spaced-apart relation to each of side edges 40, 42 of pliable protective sheet 16 and to each of guides 26, 28 as shown, for example, in FIG. 4. Retainer stops 32, 34 are located in interior region 54 of base 50 as suggested in FIGS. 2 and 3 to contact retainers 22, 24 when seat protector 14 is moved to assume the extended position.

Figure 8:
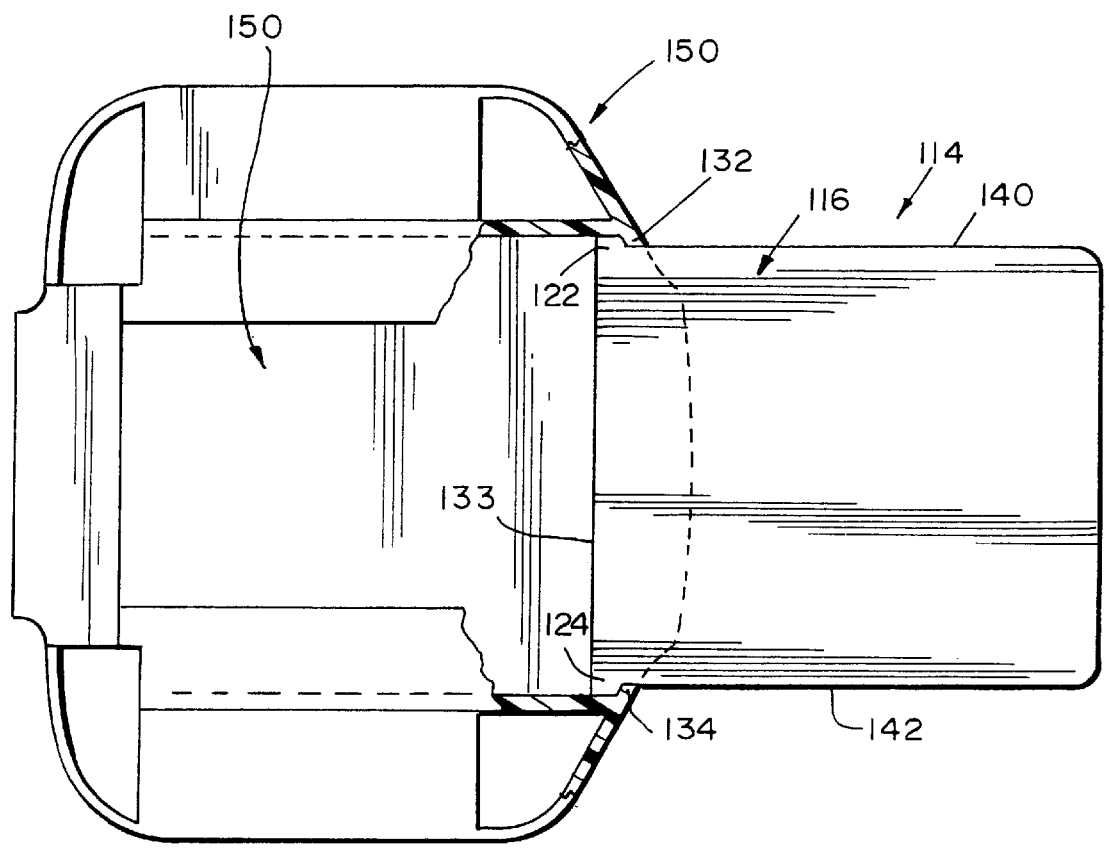
FIG. 8 is a bottom view similar to FIG. 7 of another embodiment of a seat protector in accordance with the present disclosure showing retainers located along the rear edge and each side edge to engage retainer stops positioned at each guide channel formed in the booster seat base to limit outward movement of the seat protector relative to the base.

In the embodiment illustrated in FIG. 8, seat protector 114 includes a pliable protective sheet 116 and a pair of retainers 122, 124 positioned to lie in spaced-apart relation to one another at rear edge 133 of sheet 116. Each retainer 122, 124 is also arranged to lie along one of the side edges 140, 142 of sheet 16 to contact one of the retainer stops 132, 134 formed on base 150 as suggested in FIG. 8 to limit movement of seat protector 114 relative to base 50. In the embodiment of FIG. 8, guide channels are provided to receive side edges 140, 142 of pliable protective sheet 116 to support that sheet 116 for sliding movement in interior region 154 formed in base 150.

What is claimed is:

1. A juvenile booster seat comprising
   a seat unit including a seat shell and a base under the seat shell,
   a seat protector, and
   means for supporting the seat protector for movement relative to the base between a retracted position stored in an interior region formed in the base and an extended position discharged from most of the interior region formed in the base to extend beyond a front edge of the base without separating from the base so that, in the extended position, the seat protector is adapted and positioned to drape over a front portion of a vehicle seat underlying the base.

2. The booster seat of claim 1, wherein the seat protector includes a pliable protective sheet and the supporting means includes a guide channel formed in the base and a guide coupled to the pliable protective sheet and formed to slide back and forth in the guide channel during movement of the seat protector relative to the base.

3. The booster seat of claim 2, wherein the pliable protective sheet further includes a front edge formed to include a hand grip and a rear edge positioned to lie in spaced-apart relation to the front edge and the supporting means further includes a retainer coupled to the rear edge of the pliable protective sheet and a retainer stop coupled to the base and arranged to contact the retainer to limit movement of the seat protector relative to the base during movement of the seat protector from the retracted position to the extended position.

4. The booster seat of claim 3, wherein the pliable protective sheet further includes a pair of side edges extending between the rear and front edges and the retainer is positioned to lie in spaced-apart relation to each of the side edges.

5. The booster seat of claim 3, wherein the pliable protective sheet further includes a pair of side edges extending between the rear and front edges, the guide is coupled to one of the side edges, and the retainer is positioned to lie in spaced-apart relation to the guide and to each of the side edges.

6. The booster seat of claim 3, wherein the pliable protective sheet further includes a pair of side edges extending between the rear and front edges and the retainer is positioned to lie at the rear edge along one of the side edges.

7. The booster seat of claim 2, wherein the pliable protective sheet moves to assume a planar shape when laid on a flat surface and the guide is arranged to extend upwardly away from the pliable protective sheet to lie in perpendicular relation to the pliable protective sheet when such sheet is laid on a flat surface.

8. The booster seat of claim 2, wherein the guide channel is located to communicate with the interior region formed in the base.

9. The booster seat of claim 1, wherein the seat protector includes a pliable protective sheet and the supporting means further includes a retainer coupled to the pliable protective sheet and a retainer stop coupled to the base and arranged to contact the retainer to limit movement of the seat protector relative to the base during movement of the seat protector from the retracted position to the extended position.

10. The booster seat of claim 9, wherein the pliable protective sheet further includes a front edge and a pair of side edges extending between the rear and front edges and the retainer is positioned to lie in spaced-apart relation to each of the side edges.

11. The booster seat of claim 9, wherein the pliable protective sheet further includes a front edge and a pair of side edges extending between the rear and front edges and the retainer is positioned to lie at the rear edge along one of the side edges.

12. A juvenile booster seat comprising
   a seat unit formed to include a seating surface and an interior region under the seating surface and
   a seat protector mounted for movement in the interior region of the seat between a retracted position stored in the interior region and an extended position arranged to extend out of the interior region beyond a front edge of the seat, the seat protector including a pliable protective sheet adapted and positioned to drape over a front portion of a vehicle seat underlying the seat unit and a retainer coupled to the pliable protective sheet and arranged to contact a retainer stop included in the seat unit to limit movement of the pliable protective sheet relative to the seat unit during movement of the seat protector from the retracted position to the extended position.

13. The booster seat of claim 12, wherein the pliable protective sheet further includes a front edge and a rear edge positioned to lie in spaced-apart relation to the front edge and remain in the interior region upon movement of the seat protector to the extended position and the retainer is located on the pliable protective sheet at the rear edge.

14. The booster seat of claim 13, wherein the pliable protective sheet further includes a pair of side edges extending between the rear and front edges and the retainer is positioned to lie in spaced-apart relation to each of the side edges.

15. The booster seat of claim 13, wherein the pliable protective sheet further includes a pair of side edges extending between the rear and front edges and the retainer is positioned to lie at the rear edge along one of the side edges.

16. The booster seat of claim 13, wherein the seat unit is formed to include a pair of guide channels opening into the interior region and positioned to lie in spaced-apart relation to one another, the pliable protective sheet further includes a pair of side edges extending between the front and rear edge, and each of the side edges extends into one of the guide channels formed in the seat unit to support the pliable protective sheet for sliding movement relative to the seat unit between the retracted and extended positions.

17. The booster seat of claim 16, wherein the retainer is arranged to lie in spaced-apart relation to each of the side edges.

18. The booster seat of claim 12, wherein the pliable protective sheet includes a top surface arranged to face upwardly toward the seating surface when the seat protector is moved to assume the retracted position and a bottom surface arranged to face downwardly away from the seating surface when the seat protector is moved to assume the retracted position, and the retainer is arranged on the top surface to extend upwardly toward the seating surface during movement of the seat protector between the retracted and extended positions.

19. The booster seat of claim 18, wherein the seat unit is formed to include a guide channel opening into the interior region, the seat protector further includes a guide arranged on the top surface to extend upwardly toward the seating surface when the seat protector is moved to assume the retracted position, and the guide is further arranged to slide back and forth in the guide channel during movement of the seat protector between the retracted and extended positions.

20. A juvenile booster seat comprising a seat unit formed to include a seating surface and an interior region under the seating surface and a seat protector mounted for movement in the interior region of the seat between a retracted position stored in the interior region and an extended position arranged to extend out of the interior region beyond a front edge of the seat, the seat protector including a pliable protective sheet adapted and positioned to drape over a front portion of a vehicle seat underlying the seat unit, and wherein the seat unit is formed to include a pair of guide channels opening into the interior region and positioned to lie in spaced-apart relation to one another, the pliable protective sheet further includes a pair of side edges extending between the front and rear edge, and each of the side edges extends into one of the guide channels formed in the seat unit to support the pliable protective sheet for sliding movement relative to the seat unit between the retracted and extended positions.

* * * * *